United States Patent [19]
Heyraud

[11] Patent Number: 4,543,507
[45] Date of Patent: Sep. 24, 1985

[54] SELF-SUPPORTING ROTOR COIL FOR DC-MACHINE

[75] Inventor: Marc Heyraud, La Chaux-de-Fonds, Switzerland

[73] Assignee: Portescap, La Chaux-de-Fonds, Switzerland

[21] Appl. No.: 279,315

[22] Filed: Jul. 1, 1981

Related U.S. Application Data

[63] Continuation of Ser. No. 63,095, Aug. 2, 1979, abandoned.

[30] Foreign Application Priority Data

Aug. 9, 1978 [CH] Switzerland .......................... 8461/78

[51] Int. Cl.⁴ .............................................. H02K 1/22
[52] U.S. Cl. ...................................... 310/266; 310/45; 310/220
[58] Field of Search .................... 310/156, 266, 42–45, 310/220–226, 195, 196, 208

[56] References Cited

U.S. PATENT DOCUMENTS

| | | | |
|---|---|---|---|
| 3,254,150 | 5/1966 | Rogers, Jr. | 310/45 X |
| 3,409,788 | 11/1968 | Taylor | 310/220 |
| 3,824,683 | 7/1974 | Rhudy | 310/45 X |
| 4,001,616 | 1/1977 | Lonseth et al. | 310/45 |
| 4,136,294 | 1/1979 | Aubert et al. | 310/220 |

FOREIGN PATENT DOCUMENTS

| | | | |
|---|---|---|---|
| 2755050 | 6/1979 | Fed. Rep. of Germany | 310/45 |
| 660910 | 11/1951 | United Kingdom | 310/45 |

Primary Examiner—Mark O. Budd
Attorney, Agent, or Firm—G. Lloyd Knight; Sherman O. Parrett

[57] ABSTRACT

A cylindrical, ironless, self-supporting rotor coil for use in an electrical dc-machine is disclosed. The coil is formed by at least one layer of wire, the wire having a conductive core, an insulating layer surrounding that core and an outer layer comprising a supporting material capable of being softened and subsequently solidified to make the coil self-supporting. The outer layer of the wire is at least in part electrically conductive in order to reduce the production of sparks in the commutator of the dc-machine.

1 Claim, 7 Drawing Figures

SELF-SUPPORTING ROTOR COIL FOR DC-MACHINE

This is a continuation of application Ser. No. 063,095 filed Aug. 2, 1979, now abandoned.

FIELD AND BACKGROUND OF THE INVENTION

The invention relates to electrical dc-machines of the kind having a stationary magnetic circuit with an air gap and a cylindrical, ironless, self-supporting rotor coil mounted for rotation in the said air gap. More particularly, the invention concerns a rotor coil for use in such a machine and methods of making the same.

Rotor coils with which the present invention is concerned comprise a plurality of coil sections connected in series with each other, the ends of each coil section being adapted for connection at the respective commutator segments of the dc-machine. The coil is generally formed by at least one layer of wire, the wire comprising a conductive core, an insulating layer surrounding that core and an outer layer comprising a supporting material capable of being softened and of subsequently solidifying in order to provide a mechanical support for the wound coil.

In dc-machines of the kind referred to above and more particularly in small dc-machines, the lifetime of the machine is determined by the lifetime of the commutator. A commutator comprises a number of segments connected to the coil and brushes co-operating with the said segments. When a brush is passing from one commutator segment to the following one, the self-induction of the coil generates voltage peaks and these voltage peaks lead to generation of sparks between the brush and the commutator segments. These sparks are at length damaging the commutator and considerably reduce the lifetime thereof. This is particularly undesired in the case of micromotors where the lifetime of the whole motor depends on the lifetime of the commutator.

SUMMARY OF THE INVENTION

The main object of the invention is to provide a rotor coil of the type mentioned above but additionally having an extended commutator lifetime in the dc-machine in which it is used, and to achieve this by simple means and without increasing the cost of the motor.

To this effect, in the self-supporting rotor coil according to the invention, in which the spaces between laterally adjacent wire parts of the coil are at least in part filled with the supporting material from the outer layer of the wire, said outer layer of the wire is at least in part electrically conductive.

BRIEF DESCRIPTION OF THE DRAWINGS

The nature, object and advantages of the invention will be more fully understood from the following description in accordance with the accompanying drawings in which.

DESCRIPTION OF THE DRAWINGS AND OF PREFERRED EMBODIMENTS OF THE INVENTION

Figure 1:
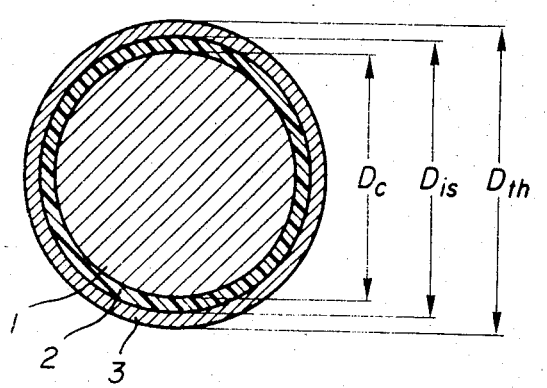
FIG. 1 is a cross-section of a wire used in the coil according to the invention.

The wire used for making a self-supporting coil in accordance with the invention is shown in cross-section in FIG. 1. A conductive core 1, generally of copper or aluminium, is surrounded by an electrically insulating layer 2 which can be made of plastics or of other suitable materials such as aluminium oxide.

The insulating layer 2 is itself surrounded by an outer layer 3 which is made of a material capable of forming the necessary mechanical support of the coil. Such a material can be a thermoplastic or thermosetting plastics material which can be softened by a thermal treatment, or a plastics material which can be softened by a chemical agent, such as a solvent, which materials solidify subsequently by cooling off or after evaporation of the solvent, for instance. The outer diameter of the core 1, the insulating layer 2 and the outer layer 3 are designated by $D_c$, $D_{is}$ and $D_{th}$, respectively. As an example, $D_c = 0.100$ mm, $D_{is} = 0.115$ mm, $D_{th} = 0.127$ mm.

Figure 2A:
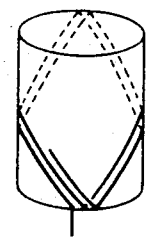
FIGS. 2a, 2b, 2c and 2d are, respectively, schematical representations of coil forms more particularly with which the present invention is concerned
Figure 2B:
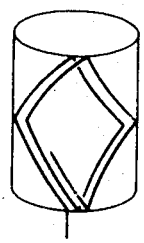
Figure 2C:
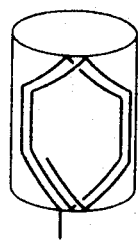
Figure 2D:
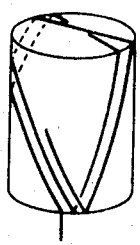

Self-supporting coils for ironless rotors with which the present invention is concerned are schematically illustrated in FIGS. 2a, to 2d. They are generally wound countinuously for instance in an oblique direction over 180 electrical degrees (FIG. 2a), or in a lozenge-shape (FIG. 2b), or in a manner derived from these basic shapes, such as a hexagonal shape (FIG. 2c) or a trapezoidal shape (FIG. 2d).

In accordance with the invention, the outer layer of the wire is at least in part electrically conductive. In one embodiment of the invention a thermoplastic polymer incorporating carbon fibers is used as the material of the outer layer of the coil wire. According to another embodiment the coil is made of a wire which immediately before winding the coil is passed through a bath of conductive glue, such as the glues currently used in electronic circuits, for instance for fixing quartz crystals.

Figure 3A:
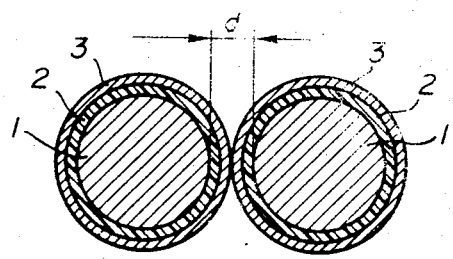
FIGS. 3a and 3b are cross-sectional views of adjacent wire parts in a coil according to the invention, respectively before and after subjecting the coil to a softening treatment of the outer layer of the wire.
Figure 3B:
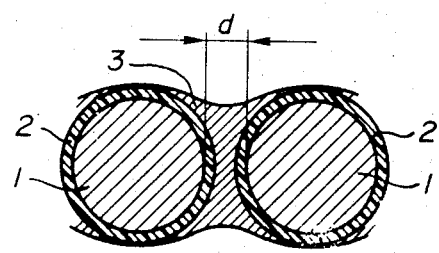

FIG. 3A shows the condition of adjacent wire parts after completion of the winding process and FIG. 3B shows the final condition thereof obtained by a softening treatment of the outer layers 3 of the wire, the space between these wire parts being partially filled with the material from layers 3. The distance D between wire cores 1 is the same in both conditions.

Another solution according to the invention consists in adding conductive material to the outer layer of the coil after the winding of the same. In particular, a metallic foil is deposited on the surface of the outer layers of the wire to make the same electrically conductive.

Making the outer layer of the wire conductive allows to obtain two effects which contribute to diminish the maximum voltage induced in the coil during commutation. First, due to the fact that the inductance of a rotor coil with which the present invention is concerned, is very small, for instance about 1 $\mu$H, and is associated with a very small capacitance, for instance of about 100 pF for the same type of coil, it will be sufficient to increase the capacitance by about 100 pF to obtain a substantial reduction of the maximum value of the voltage induced during the commutation. As the conductive layer has a surface which is substantially the same as that of the coil, and is placed at leas than about 10 $\mu$m from the conductive core of the rotor wire, this will allow to increase the capacitance of the coil by more than 100%.

Furthermore, the conductive layer represents a load circuit coupled to the circuit of the sparks which are generated by the commutation, due to the fact that the corresponding steep-edged voltage peaked induce eddy currents in that layer. The height of the voltage peaks will therefore be considerably reduced.

The structure according to the invention results therefore in a longer life of the commutator and in improved electrical properties of the machine. This is particularly important for small dc-motors with a view to their total manufacturing costs and their fields of use.

It is to be noted that the effectiveness of the conductive layer is not proportional to the energy loss by eddy currents which will occur during the rotation of the coil. Due to the very small inductances and capacitances involved in ironless rotors the durations of the commutations are very short and the energies concerned by each commutation are considerably lower than the mechanical energy of the motor, for instance. The conductive layer can therefore be made very thin in order to reduce the losses during the rotation of the rotor. The desired losses during the commutation will however be sufficient. In a practical embodiment based on the micromotor type 26 PL213P manufactured by PORTESCAP the voltage peaks occurring during the commutation could be reduced by one half while the losses in torque were less than 1% of the maximum useful torque.

I claim:

1. A cylindrical, ironless, self-supporting rotor coil for use in a low voltage electrical dc-machine of the kind having a stationary magnetic circuit with an air gap in which the rotor coil is mounted for rotation, said rotor coil comprising a plurality of coil sections connected in series with each other, the ends of each coil section being adapted for connection to respective commutator segments, the rotor coil being formed by at least one layer of wire, the wire having a conductive core, and insulating layers surrounding the said core and an outer layer comprising a supporting material capable of being softened and subsequently solidified, the spaces between laterally adjacent wire parts of the coil being at least in part filled with said supporting material, said outer layer of the wire being at least in part electrically conductive for reducing the production of sparks in the commutator of the dc-machine, wherein said outer layer is made of a thermoplastic polymer incorporating carbon fibers.

* * * * *